US012579673B2

(12) United States Patent
Chou et al.

(10) Patent No.: US 12,579,673 B2
(45) Date of Patent: Mar. 17, 2026

(54) EVALUATION METHOD OF CRANIOFACIAL ASYMMETRY INDEX BASED ON ARTIFICIAL INTELLIGENCE

(71) Applicants: Chang Gung Memorial Hospital, Linkou, Taoyuan City (TW); National Tsing Hua University, Hsinchu (TW)

(72) Inventors: Pang-Yun Chou, Taoyuan City (TW); Chang-Chun Lee, Hsinchu (TW); Sheng-Hong Yu, Hsinchu (TW); De-Yi Yeh, Hsinchu (TW)

(73) Assignees: Chang Gung Memorial Hospital, Linkou, Taoyuan City (TW); National Tsing Hua University, Hsinchu (TW)

( * ) Notice: Subject to any disclaimer, the term of this patent is extended or adjusted under 35 U.S.C. 154(b) by 280 days.

(21) Appl. No.: 18/372,747

(22) Filed: Sep. 26, 2023

(65) Prior Publication Data

US 2025/0078304 A1     Mar. 6, 2025

(30) Foreign Application Priority Data

Aug. 31, 2023     (TW) ................................. 112133141

(51) Int. Cl.
*G06T 7/68*     (2017.01)
*G06T 7/50*     (2017.01)
*G06T 7/73*     (2017.01)

(52) U.S. Cl.
CPC .................. *G06T 7/68* (2017.01); *G06T 7/50* (2017.01); *G06T 7/74* (2017.01); *G06T 2200/04* (2013.01);
(Continued)

(58) Field of Classification Search
CPC .... G06T 7/68; G06T 7/74; G06T 7/50; G06T 2200/04; G06T 2207/30004; G06T 2207/30201; G06T 2207/30204
See application file for complete search history.

(56) References Cited

U.S. PATENT DOCUMENTS

2012/0010533 A1*  1/2012  Arnett .................. A61B 5/6814
                                          600/587
2013/0033482 A1*  2/2013  Luisi ...................... G06T 17/10
                                          345/419
(Continued)

FOREIGN PATENT DOCUMENTS

WO     WO-2018212632 A1 * 11/2018  ......... A61F 5/05891

OTHER PUBLICATIONS

Translation of WO 2018212632 A1 (Year: 2018).*

*Primary Examiner* — Lixi C Simpson

(57)     ABSTRACT

An evaluation method of craniofacial asymmetry index based on artificial intelligence is disclosed and includes: a craniofacial image shooting step: obtaining a craniofacial model file of a patient; an artificial intelligence head shape identification and feature point marking step: importing the craniofacial model file into an artificial intelligence algorithm, performing identification and feature point marking on a craniofacial image in the craniofacial model file to generate at least one feature point; a craniofacial space coordinate axis establishment step: including a coordinate axis y-z plane establishment step, a coordinate axis origin establishment step and a z-axis orientation definition step; and an artificial intelligence skew degree estimation step: inputting the craniofacial model file and corresponding coordinate axes into an artificial intelligence skew degree evaluation algorithm simultaneously, and presenting a craniofacial skew degree in a data visualization manner.

5 Claims, 7 Drawing Sheets

(52) U.S. Cl.
CPC .............. *G06T 2207/30004* (2013.01); *G06T 2207/30201* (2013.01); *G06T 2207/30204* (2013.01)

(56) References Cited

U.S. PATENT DOCUMENTS

| | | | |
|---|---|---|---|
| 2021/0004957 A1* | 1/2021 | Aalamifar | ............. G16H 50/30 |
| 2025/0057683 A1* | 2/2025 | Littlefield | ............. B33Y 80/00 |

* cited by examiner

EVALUATION METHOD OF CRANIOFACIAL ASYMMETRY INDEX BASED ON ARTIFICIAL INTELLIGENCE

CROSS-REFERENCE TO RELATED APPLICATION

This application claims the priority of Taiwanese patent application No. 112133141, filed on Aug. 31, 2023, which is incorporated herewith by reference.

BACKGROUND OF THE INVENTION

1. Field of the Invention

The present invention relates to the technical field of a method for evaluating head shape and skewness, and more particularly, to an evaluation method of craniofacial asymmetry index based on artificial intelligence.

2. The Prior Arts

Currently, the evaluation of the degree of skew of the infant's head is usually obtained by doctors through experience to capture a certain plane image of the infant's head and then perform calculations. Alternatively, use the midpoint between the two ear holes and another reference point (or feature point) to form a coordinate system and capture its plane for estimation.

However, the former (i.e. obtained by the doctors through experience to capture a certain plane image of the infant's head and then perform calculations) is not objective in calculation, and may produce different results due to the doctor's subjective opinion; the latter (i.e. use the midpoint between the two ear holes and another reference point (or feature point) to form a coordinate system and capture its plane for estimation) uses the midpoint between the two ear holes easily because the craniofacial skew of the infant itself distorts the captured plane, resulting in a lack of accuracy.

SUMMARY OF THE INVENTION

A main objective of the present invention is to provide an evaluation method of craniofacial asymmetry index based on artificial intelligence. The method uses artificial intelligence to identify the head shape and automatically mark feature points to establish the coordinate axis of the craniofacial space. Firstly, a plane is established from the center of the eyebrows, the most concave point of the bridge of the nose, and the tip of the nose. Then, the ear holes on both sides are at the vertical point of the plane and then the midpoint is taken, and the z-axis is formed with the most concave point of the bridge of the nose, that is, a three-dimensional coordinate system is established on the head (that is, the coordinate axes are clear). In this way, according to different planes, the asymmetry of different blocks can be selected for identification and evaluation. Each infant (or patient) defines his or her own coordinate axis, and has its own coordinate axis for evaluation and comparison (i.e. setting coordinate points allows artificial intelligence to place them on its own). It can be used to compare with MATLAB asymmetry, which is more convenient and accurate (that is, the asymmetry measurement is optimized).

To achieve the aforementioned objectives, the present invention provides an evaluation method of craniofacial asymmetry index based on artificial intelligence, wherein the method comprises a craniofacial image shooting step:

obtaining a craniofacial model file of a patient; an artificial intelligence head shape identification and feature point marking step: importing the craniofacial model file into an artificial intelligence algorithm, performing identification and feature point marking on a craniofacial image in the craniofacial model file to generate at least one feature point; a craniofacial space coordinate axis establishment step: including a coordinate axis y-z plane establishment step, a coordinate axis origin establishment step and a z-axis orientation definition step; and an artificial intelligence skew degree estimation step: inputting the craniofacial model file and corresponding coordinate axes into an artificial intelligence skew degree evaluation algorithm simultaneously, and presenting a craniofacial skew degree in a data visualization manner.

In some embodiments, the craniofacial image in the craniofacial model file includes a face, a head and a back of a skull.

In some embodiments, the craniofacial image shooting step is performed by a three-dimensional photography device.

In some embodiments, in the artificial intelligence head shape identification and feature point marking step, the artificial intelligence algorithm first identifies a skew type of the craniofacial image from the craniofacial model file, and then automatically identifies the skew type of the craniofacial image, and the at least one feature point is marked as the basis for the craniofacial space coordinate axis establishment step.

In some embodiments, the coordinate axis y-z plane establishment step is to select three characteristic points of a brow center, a most concave point of a bridge of the nose and a tip of a nose among the at least one characteristic point, and define a first symmetrical plane as the coordinate axis y-z plane with these characteristic points.

In some embodiments, the coordinate axis origin establishment step is to use the characteristic points of the left and right ear holes on both sides to project the characteristic points of the left and right ear holes on both sides to the coordinate axis y-z plane establishment step, and after obtaining a second plane of symmetry, take a midpoint position of both sides to define as the origin of the coordinate axis.

In some embodiments, the z-axis orientation definition step is to define a line between the most concave point of the bridge of the nose and the origin of the coordinate axis as the z-axis orientation.

In some embodiments, the artificial intelligence skew degree evaluation algorithm in the artificial intelligence skew degree estimation step calculates an asymmetry value of a craniofacial size based on the inputted craniofacial model file and a skew type and an overall space vector and presents a degree of craniofacial skew in a data visualization format.

In order to make the above-mentioned objectives, features and advantages of the present invention more obvious and easy to understand, the specific embodiments listed in each figure are explained in detail below.

DETAILED DESCRIPTION OF THE PREFERRED EMBODIMENT

Figure 1:
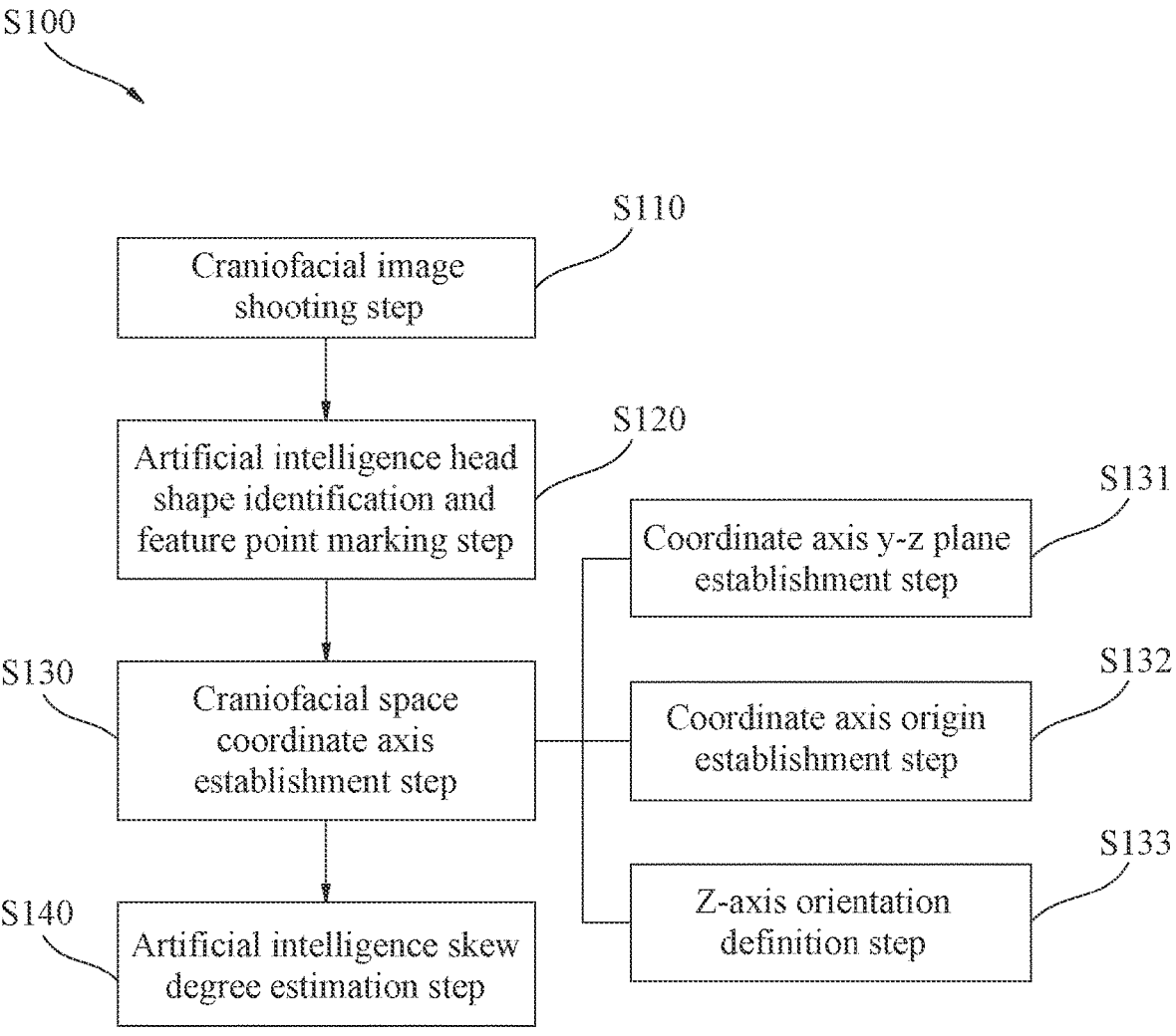
FIG. 1 is a flow chart of an evaluation method of craniofacial asymmetry index based on artificial intelligence of the present invention.

The technical solutions of the present invention will be clearly and completely described below in conjunction with specific embodiments and accompanying drawings. It should be noted that when an element is referred to as being "mounted on or fixed on" another element, it means that it may be directly located on the other element or an intervening element can be presented. When an element is referred to as being "connected" to another element, it means that it may be directly connected to the other element or an intervening element can be presented. "Axial" refers to the direction of the central axis of the element. "Radial" refers to the direction perpendicular to the central axis of the element. In the illustrated embodiments, "Outer diameter" is the diameter passing through the central axis of the component. Directions represented by up, down, left, right, front and rear, etc. are relative, and are used to explain that the structure and movement of different elements are relative in the present invention. These representations are appropriate when the components are located in the positions shown in the drawings. However, if the description of the position of elements changes, these representations are considered to change accordingly.

Unless otherwise defined, all technical and scientific terms used herein have the same meaning as commonly understood by those skilled in the art. The terms used herein is for the purpose of describing specific embodiments only but is not intended to limit the present invention. As used herein, the term "and/or" includes any and all combinations of one or more related listed items.

FIG. 1 is a flow chart of an evaluation method of craniofacial asymmetry index based on artificial intelligence of the present invention. Please refer to FIG. 1, an evaluation method S100 of craniofacial asymmetry index based on artificial intelligence of the present invention includes a craniofacial image shooting step S110, an artificial intelligence head shape identification and feature point marking step S120, a craniofacial space coordinate axis establishment step S130, and an artificial intelligence skew degree estimation step S140.

Figure 2:
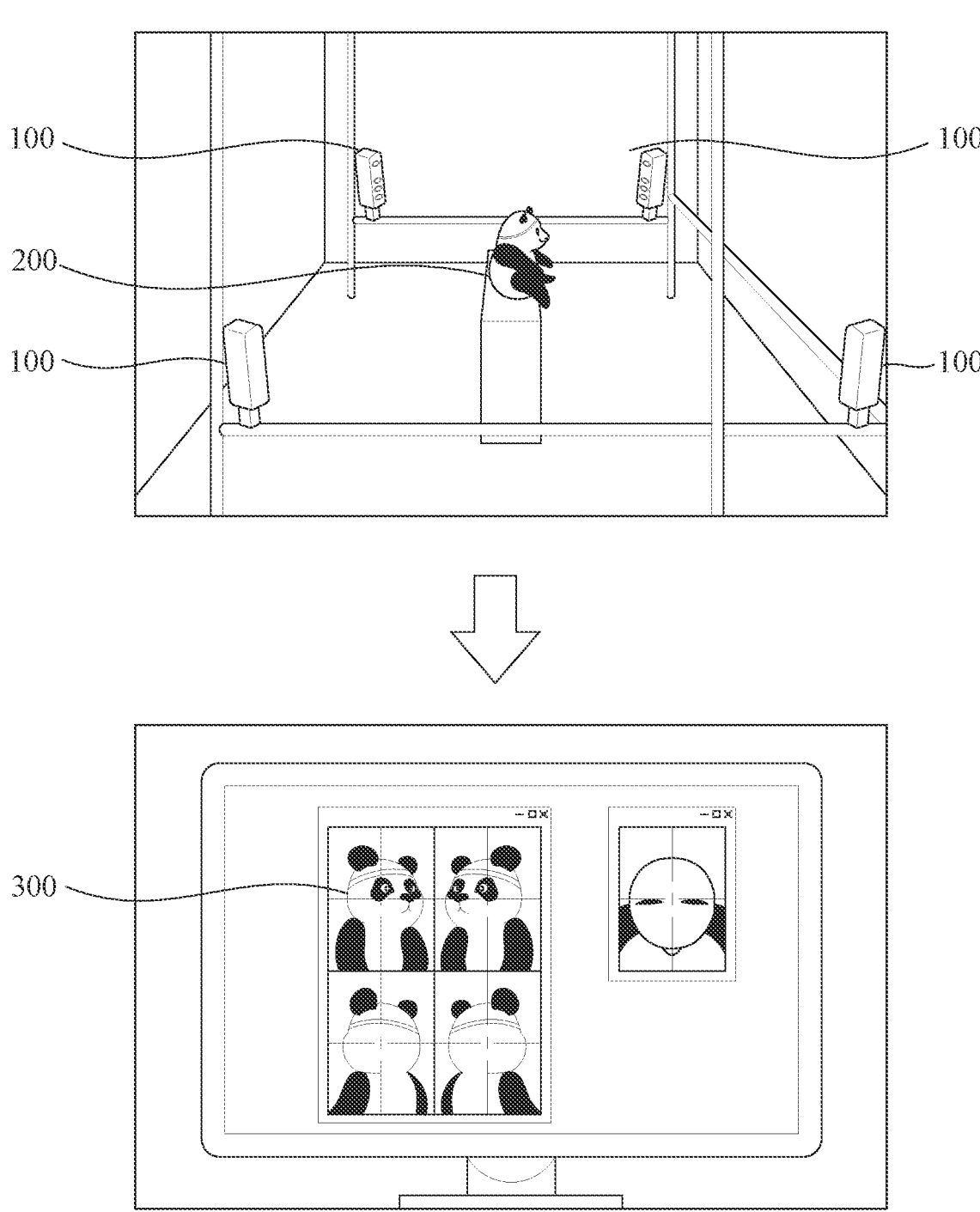
FIG. 2 is a schematic diagram of the implementation of a craniofacial image shooting step in the evaluation method of craniofacial asymmetry index based on artificial intelligence of the present invention.

FIG. 2 is a schematic diagram of the implementation of a craniofacial image shooting step in the evaluation method of craniofacial asymmetry index based on artificial intelligence of the present invention. Please refer to FIG. 1 and FIG. 2, in step S110, a three-dimensional imaging device 100 is used to sample a cranial face of a patient 200 to obtain a craniofacial model file of the patient, and the craniofacial model file may include a craniofacial image 300. In some embodiments, the craniofacial image in the craniofacial model file include a face, a head, and a back of the head, but are not limited thereto.

Figure 3:
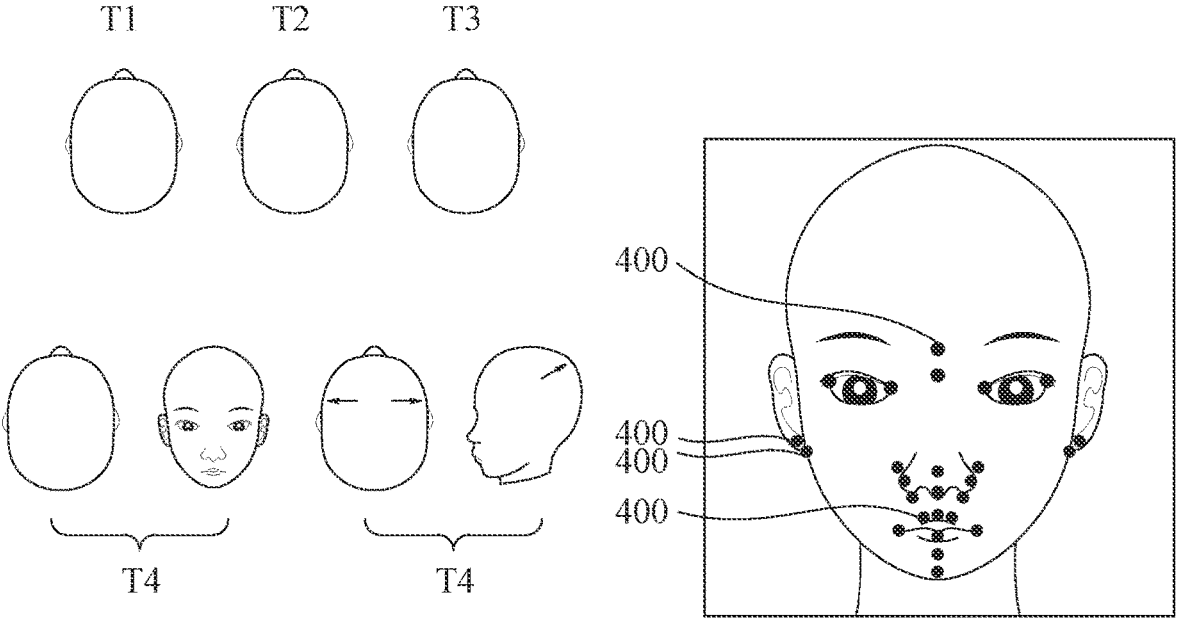
FIG. 3 is a schematic diagram of the implementation of an artificial intelligence head shape identification and feature point marking step in the evaluation method of craniofacial asymmetry index based on artificial intelligence of the present invention.

FIG. 3 is a schematic diagram of the implementation of an artificial intelligence head shape identification and feature point marking step in the evaluation method of craniofacial asymmetry index based on artificial intelligence of the present invention. Please refer to FIG. 1 and FIG. 3, in step S120, the craniofacial model file is imported into an established artificial intelligence algorithm, and the craniofacial image in the craniofacial model file is identified and feature points are marked to generate at least one feature point 400. In some embodiments, the artificial intelligence algorithm first identifies a skew type of the craniofacial image 300 from the craniofacial model file (for example, type T1 to type T5 in FIG. 3), and then the at least one feature point 400 of the craniofacial image 300 in the skew type is automatically identified and marked as the basis for step S130 (i.e., the craniofacial space coordinate axis establishment step).

Figure 4:
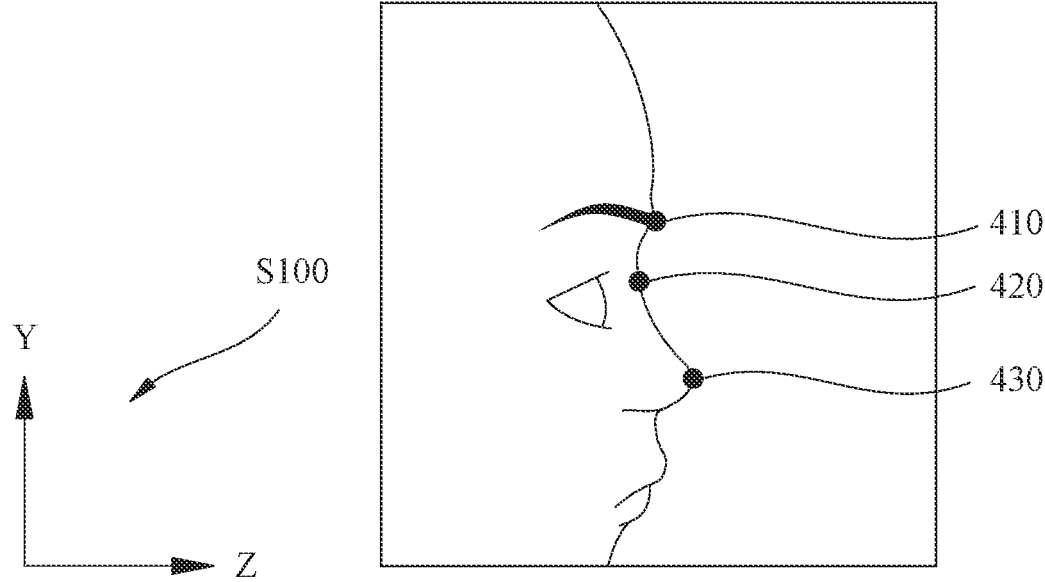
FIG. 4 to FIG. 6 are schematic diagrams of the implementation of a craniofacial space coordinate axis establishment step in the evaluation method of craniofacial asymmetry index based on artificial intelligence of the present invention.
Figure 5:
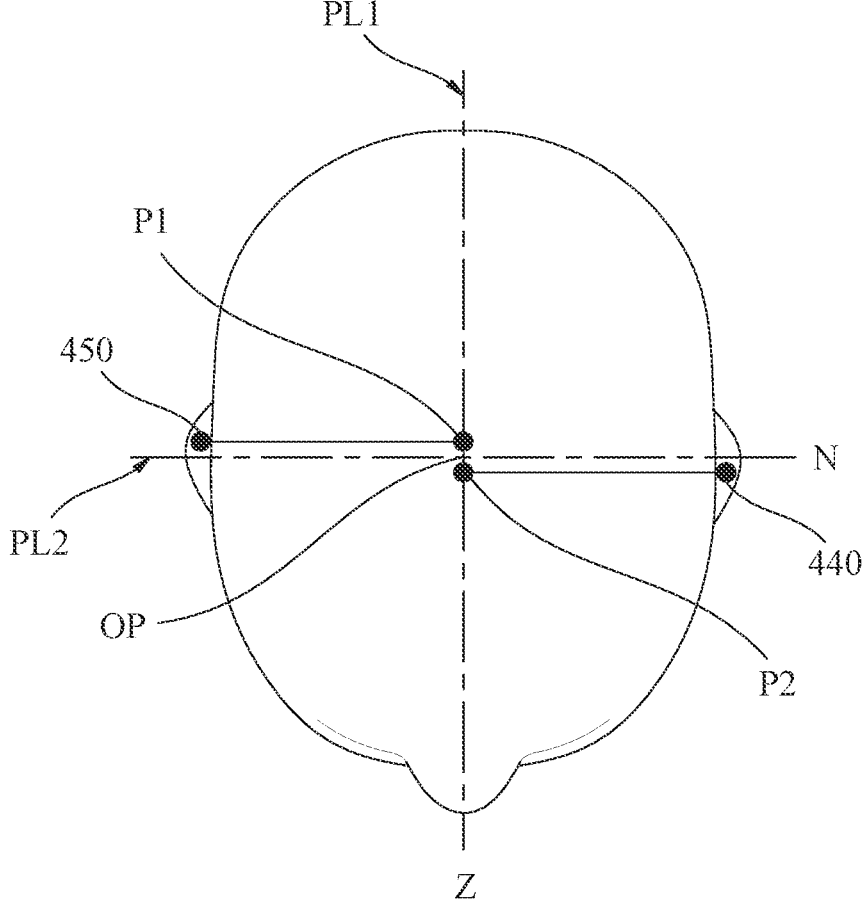
Figure 6:
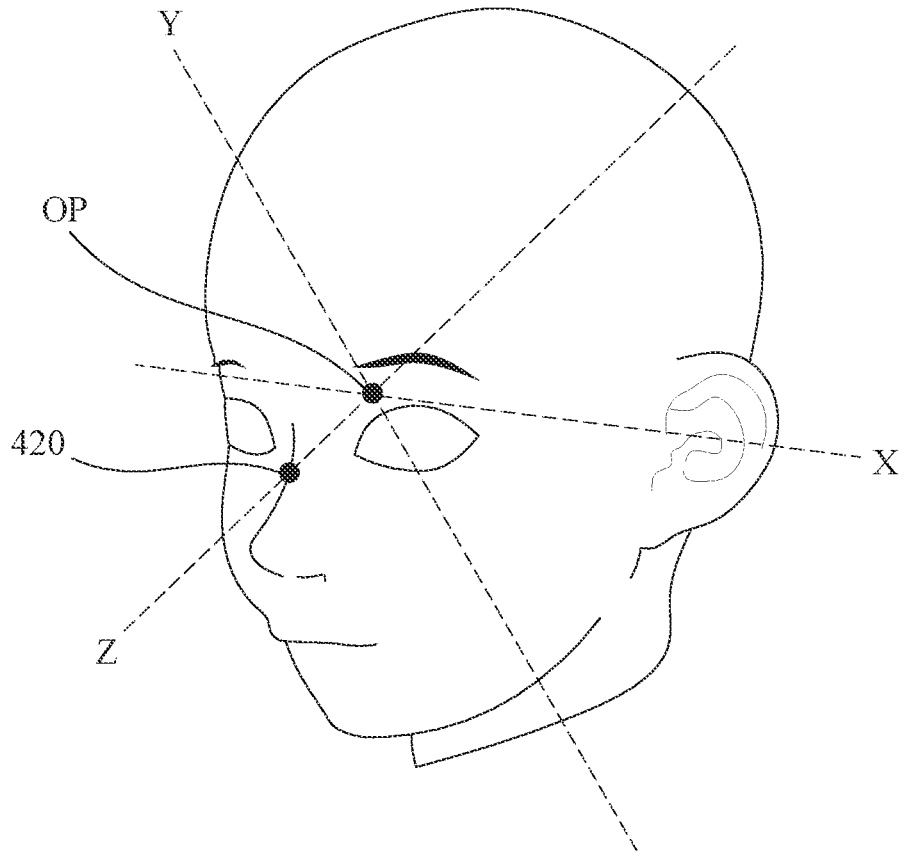

FIG. 4 to FIG. 6 are schematic diagrams of the implementation of a craniofacial space coordinate axis establishment step in the evaluation method of craniofacial asymmetry index based on artificial intelligence of the present invention. In order to objectively evaluate the craniofacial skew degree of infants, it is necessary to construct a set of Karst coordinate axes (system) that can locate various types of craniofacial spatial coordinates; however, in order to completely define the coordinate axis (system), the six degrees of freedom of the head model need to be defined using the positions of each feature point on the face, and an origin of the coordinate axis must be fixed. Therefore, please refer to FIG. 1 and FIG. 4 to FIG. 6, step S130 includes a coordinate axis y-z plane establishment step S131, a coordinate axis origin establishment step S132 and a z-axis orientation definition step S133.

Please refer to FIG. 4, the coordinate axis y-z plane establishment step S131 is to select three characteristic points of a brow center 410, a most concave point 420 of a bridge of a nose and a tip 430 of the nose among the at least one characteristic point, and define a first symmetrical plane PL1 as the coordinate axis y-z plane with these characteristic points (the brow center 410, the most concave point 420 of the bridge of the nose and the tip 430 of the nose).

Please refer to FIG. 5, the coordinate axis origin establishment step S132 is to use the characteristic points of the left and right ear holes 440, 450 on both sides to project the characteristic points of the left and right ear holes on both sides (i.e., projection points P1, P2) to the coordinate axis y-z plane establishment step S131, and after obtaining a second symmetrical plane PL2, take a midpoint position of both sides to define as the origin OP of the coordinate axis.

Please refer to FIG. 6, the z-axis orientation definition step S133 is to define a line between the most concave point 420 of the bridge of the nose and the origin OP of the coordinate axis as the z-axis orientation.

Figure 7:
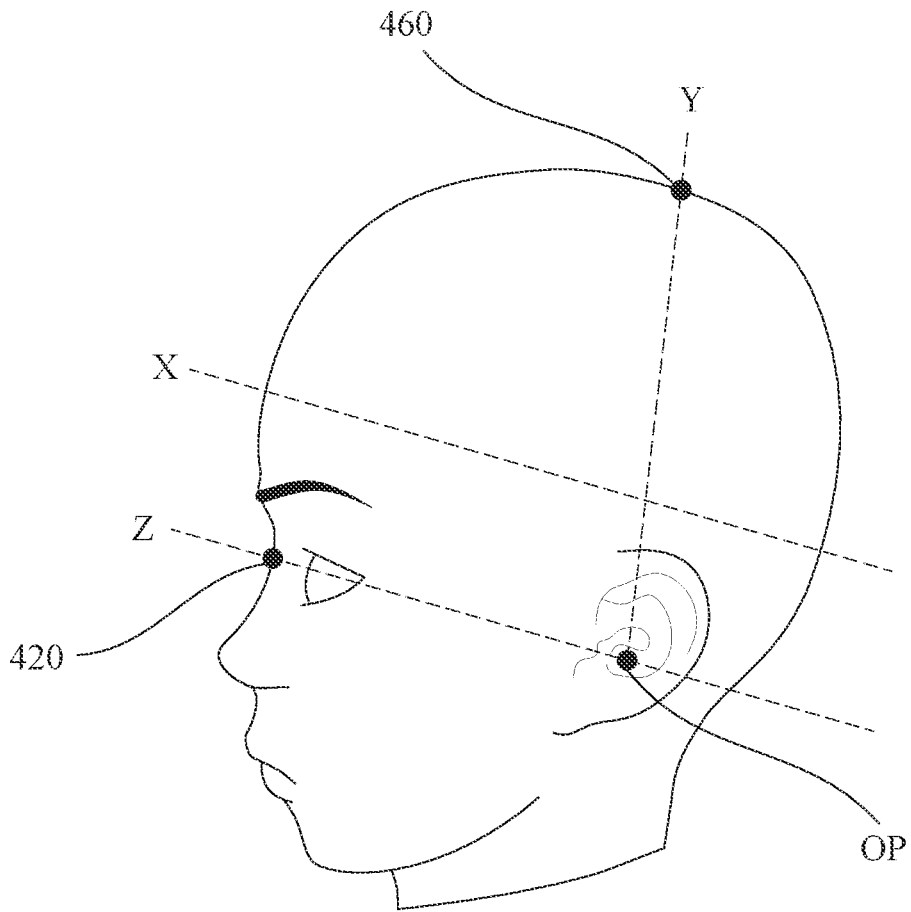
FIG. 7 is a schematic diagram of the implementation of an artificial intelligence skew degree estimation step in the evaluation method of craniofacial asymmetry index based on artificial intelligence of the present invention.

FIG. 7 is a schematic diagram of the implementation of an artificial intelligence skew degree estimation step in the evaluation method of craniofacial asymmetry index based on artificial intelligence of the present invention. Please refer to FIG. 1 and FIG. 7, the artificial intelligence skew degree evaluation algorithm in the artificial intelligence skew degree estimation step S140 calculates an asymmetry value of a craniofacial size based on the inputted craniofacial model file and a skew type and an overall space vector and presents a degree of craniofacial skew in a data visualization format. That is to say, after the craniofacial space coordinates are established, the craniofacial model file (model) and the corresponding coordinate axes are inputted into an established artificial intelligence skew degree evaluation algorithm at the same time, and the artificial intelligence skew degree evaluation algorithm will calculate the asymmetry value of the craniofacial size according to the craniofacial model file (model) input, according to its skew type and the overall space vector. In some embodiments, the numeral 460 in FIG. 7 represents the top of the cranial face.

In summary, the evaluation method of craniofacial asymmetry index based on artificial intelligence of the invention uses artificial intelligence to identify the head shape and automatically mark feature points to establish the coordinate axis of the craniofacial space. Firstly, a plane is established from the center of the eyebrows, the most concave point of the bridge of the nose, and the tip of the nose. Then, the ear holes on both sides are at the vertical point of the plane and then the midpoint is taken, and the z-axis is formed with the most concave point of the bridge of the nose, that is, a three-dimensional coordinate system is established on the head (that is, the coordinate axes are clear). In this way, according to different planes, the asymmetry of different blocks can be selected for identification and evaluation. Each infant (or patient) defines his or her own coordinate axis, and has its own coordinate axis for evaluation and comparison (i.e. setting coordinate points allows artificial intelligence to place them on its own). It can be used to compare with MATLAB asymmetry, which is more convenient and accurate (that is, the asymmetry measurement is optimized).

The above described are only preferred embodiments of the present invention, and are not intended to limit the scope of the embodiments of the present invention. That is, all equivalent changes and modifications made according to the claims of the present invention are covered by the claimed scope of the present invention.

What is claimed is:

1. An evaluation method of craniofacial asymmetry index based on artificial intelligence, comprising:

a craniofacial image shooting step: obtaining a craniofacial model file of a patient;

an artificial intelligence head shape identification and feature point marking step: importing the craniofacial model file into an artificial intelligence algorithm, performing identification and feature point marking on a craniofacial image in the craniofacial model file to generate at least one feature point;

a craniofacial space coordinate axis establishment step: including a coordinate axis y-z plane establishment step, a coordinate axis origin establishment step and a z-axis orientation definition step; and an artificial intelligence skew degree estimation step: inputting the craniofacial model file and corresponding coordinate axes into an artificial intelligence skew degree evaluation algorithm simultaneously, and presenting a craniofacial skew degree in a data visualization manner;

wherein the coordinate axis y-z plane establishment step is to select a brow center, a most concave point of a bridge of a nose and a tip of the nose to define a first symmetrical plane as a coordinate axis y-z plane;

wherein the coordinate axis origin establishment step is to select left and right ear holes on two sides, project the left ear hole and the right ear hole respectively to the coordinate axis y-z plane to obtain two projected points, take a midpoint position of the two projected points and define the midpoint position as a coordinate axis origin; and wherein the z-axis orientation definition step is to identify a line formed by the most concave point of the bridge of the nose and the coordinate axis origin, and define the line as a z-axis orientation.

2. The method according to claim 1, wherein the craniofacial image in the craniofacial model file includes a face, a head and a back of a skull.

3. The method according to claim 1, wherein the craniofacial image shooting step is performed by a three-dimensional photography device.

4. The method according to claim 1, wherein in the artificial intelligence head shape identification and feature point marking step, the artificial intelligence algorithm first identifies a skew type of the craniofacial image from the craniofacial model file, and then automatically identifies the skew type of the craniofacial image, and the at least one feature point is marked as a basis for the craniofacial space coordinate axis establishment step.

5. The method according to claim 1, wherein the artificial intelligence skew degree evaluation algorithm in the artificial intelligence skew degree estimation step calculates an asymmetry value of a craniofacial size based on the inputted craniofacial model file and a skew type and an overall space vector and presents a degree of craniofacial skew in a data visualization format.

* * * * *